United States Patent
Saarikivi et al.

(10) Patent No.: US 7,827,579 B2
(45) Date of Patent: Nov. 2, 2010

(54) MOBILE TELEVISION ELECTRONIC SERVICE GUIDE DELIVERY SYSTEM

(75) Inventors: Tuomo Saarikivi, Helsinki (FI); Dominique Müller, Helsinki (FI); Topi Pohjolainen, Helsinki (FI)

(73) Assignee: Nokia Corporation, Espoo (FI)

( * ) Notice: Subject to any disclaimer, the term of this patent is extended or adjusted under 35 U.S.C. 154(b) by 932 days.

(21) Appl. No.: 10/936,818

(22) Filed: Sep. 9, 2004

(65) Prior Publication Data

US 2006/0053450 A1    Mar. 9, 2006

(51) Int. Cl.
H04N 5/445 (2006.01)
(52) U.S. Cl. .......................... 725/59; 725/50
(58) Field of Classification Search .................. 725/50, 725/39
See application file for complete search history.

(56) References Cited

U.S. PATENT DOCUMENTS

| | | | |
|---|---|---|---|
| 6,209,131 B1 | 3/2001 | Kim et al. | |
| 2002/0144254 A1 | 10/2002 | Owada | |
| 2004/0140995 A1 | 7/2004 | Goldthwaite et al. | |
| 2005/0028208 A1* | 2/2005 | Ellis et al. | 725/58 |
| 2006/0155850 A1* | 7/2006 | Ma et al. | 709/226 |
| 2006/0253544 A1* | 11/2006 | Luoma et al. | 709/217 |

FOREIGN PATENT DOCUMENTS

| | | |
|---|---|---|
| EP | 0 823 798 A1 | 2/1998 |
| EP | 1 022 908 A1 | 7/2000 |
| EP | 1 126 707 A1 | 8/2001 |
| EP | 1246057 | 10/2002 |
| GB | 2396228 A | 6/2004 |
| GB | 2407242 A | 4/2005 |
| GB | 2407745 A | 5/2005 |
| WO | WO 03/032148 A1 | 4/2003 |
| WO | WO 2004/056096 A1 | 7/2004 |
| WO | WO 2004056096 A1 * | 7/2004 |

OTHER PUBLICATIONS

Notification of First Office Action in Chinese Application No. 200580030113.5, dated May 9, 2008.
Korean Intellectual Property Office Non-Final Rejection of Korean Application No. 10-2007-7006508, dated Dec. 18, 2007, with accompanying English Translation.

(Continued)

Primary Examiner—Joseph P Hirl
Assistant Examiner—Jivka Rabovianski
(74) Attorney, Agent, or Firm—Ditthavong Mori & Steiner, P.C.

(57) ABSTRACT

Methods and systems for transmitting electronic service guide (ESG) data to a mobile terminal are described. The method for delivery of ESG data comprises steps of receiving ESG data, encapsulating metadata associated with the ESG data to generate a new ESG object, replacing a current ESG object with the new ESG object, transmitting the new ESG object in a carousel, and transmitting a notification of a change in the carousel. Another method for receiving ESG data comprises steps of receiving a notification of a change in a carousel, receiving a new ESG object in the carousel, replacing a current ESG object with the new ESG object, extracting metadata associated with ESG data from the new ESG object, storing the ESG data and metadata, and updating an ESG on a mobile terminal with the ESG data.

51 Claims, 12 Drawing Sheets

OTHER PUBLICATIONS

Chinese Office Action for corresponding CN Application No. 2005800301135, Nov. 6, 2009, China.

Mexican Office Action for corresponding MX Application No. MX/a/2007/002472, Aug. 26, 2009, Mexico.

Mexican Office Action for corresponding MX Application No. MX/a/2007/002472, Feb. 26, 2010, Mexico, pp. 1-5.

Extended European search report for corresponding EP patent app. No. 05772031.0 - 2202 dated Jun. 25, 2010, pp. 1-10.

* cited by examiner

MOBILE TELEVISION ELECTRONIC SERVICE GUIDE DELIVERY SYSTEM

FIELD OF THE INVENTION

The invention relates generally to mobile telecommunications networks. More specifically, the invention provides a method and system for updating electronic service guide data in a mobile terminal operating in a unidirectional communication environment.

BACKGROUND OF THE INVENTION

Audio, video and other types of data may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. However, it can be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is Digital video broadcasting-handheld (DVB-H), a recently developed technology that increases the capabilities and services available on small handheld devices, such as mobile telephones. The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetised data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

Carousels are intended for the periodic transmission of information over the transport stream (TS). Although the content of a carousel can be changed in response to a request from a destination device, it is more usual for the carousel to be repeated regardless of whether any destination device is active or requesting the carousel data at that moment. A destination device that needs specific data waits until the needed data is retransmitted. Data carousels contain modules of data of unspecified content. Therefore, the destination device must know what to do with the data received. Alternatively, object carousels contain identifiable data objects such as .jpg or .txt files and even the application software needed to use other objects. A directory structure enables a destination device to find an object, to extract and download the object's associated application software, and then to use the object. Data carousels are often used for downloading new system software to destination device whereas an object carousel is typically used for game delivery, shopping services, and electronic service guides (ESG). Both data and object carousels are repeated at periodic intervals though the repetition rate can vary from item to item. For example the ESG for the next hour viewing options may repeat more often than that for the next month.

A number of applications can be included in the same carousel at the same time allowing users the opportunity, e.g., to choose between looking at an ESG and playing an interactive game. Where applications relate to a particular TV program or commercial, it may be desirable for the application to be available to the user for a period of time after the program has ended even though a new application for the next TV program is available. The object carousel generator has to share the overall carousel bandwidth between the various applications being carried at any one time.

Under conventional systems, once a carousel has been generated, changes to programming cannot be made prior to the start of a specified program. As with a printed newspaper, once an ESG has been generated and delivered in a carousel, the content of the ESG cannot be changed. An operator may need to change a program list due to the cancellation of a live event, the unexpected broadcast of a major news event, or the blackout of a broadcast of a sporting event. In the case of a canceled event, the operator may desire to change the live event with a sequence of other programming, such as cartoons, during the two-hour program slot originally set for the live event. Under conventional systems, an operator can change the actual broadcast, but she cannot change the program list received by a mobile terminal. A mobile terminal user can see the cartoons; however, the ESG data still identifies the programming, the cartoons, as the live event.

BRIEF SUMMARY OF THE INVENTION

According to aspects of the invention, electronic service guide (ESG) data is received in a network and metadata associated with the ESG data is encapsulated to generate a new ESG object. A current ESG object is replaced with the new ESG object. The new ESG object is transmitted in a carousel to mobile terminals and a notification of the change to the carousel is transmitted also. In accordance with another aspect, the notification and ESG object in the carousel are received at mobile terminals. The new ESG object replaces the current ESG object in the mobile terminals. An ESG object parser extracts the metadata associated with the ESG data from the new ESG object and stores the metadata in a database. The mobile terminals' displays are updated to reflect the change in the ESG. Depending on the nature of the change, the user may be notified by the mobile terminal.

Another aspect of the invention provides a system for delivering ESG data and a system for receiving ESG data. A carousel manager controls operation of a carousel generator to update the carousel data being transmitted to mobile terminals. A carousel manager in the mobile terminals controls operation of a carousel receiver in the mobile terminal to receive the updated carousel. The carousel manager in the mobile terminal can determine the appropriate time to update the ESG data within the mobile terminal.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1A:
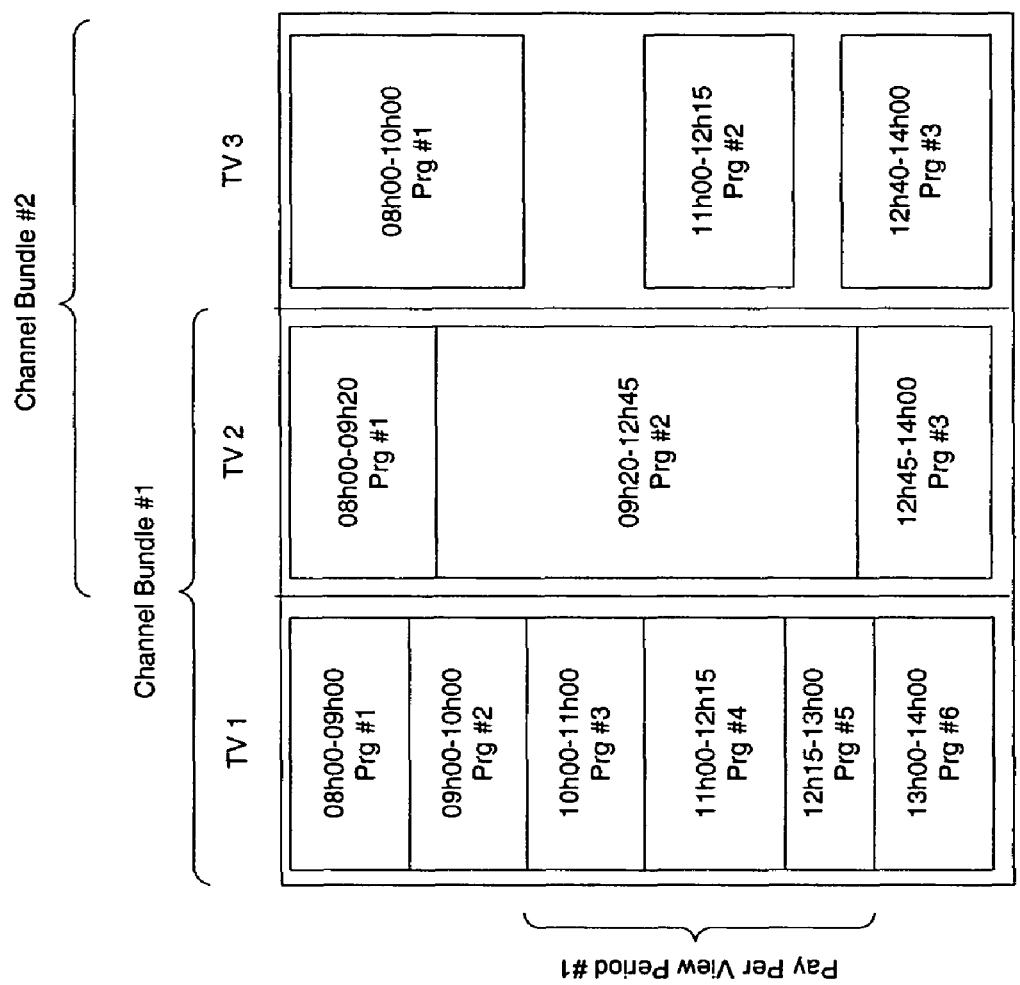
FIG. 1A illustrates a schematic diagram of an example electronic service guide (ESG) as displayed on a mobile terminal equipped with television reception capability in accordance with at least one aspect of the present invention.

FIG. 1A illustrates a schematic diagram of an example electronic service guide (ESG) as displayed on a mobile terminal equipped with television reception capability in accordance with at least one aspect of the present invention. Television channels TV1-TV3 are shown. Channel Bundle #1 includes TV channels TV1 and TV2 for which subscriptions can be purchased. Similarly, Channel Bundle #2 includes TV channels TV2 and TV3. As shown, each TV channel has a sequence of non-overlapping programs that cover the entire time axis. Pay-per-view period #1 (of TV channel TV1) includes the hours of 10:00 am to 13:00 pm for which pay-per-view rights may be purchased.

Generally, there can be program breaks for a certain TV channel, e.g., the time axis is not completely covered. Such an example is shown by the gap between program #1 and program #2 for TV channel TV3. The program provides information and metadata to a user. The TV channel is not interrupted between programs and it is possible to continue to receive the TV channel from one program to the next. A TV channel may appear in more than one bundle and free to air channels, i.e., channels that can be viewed without a purchase transaction, may not appear in any bundle. It should be understood by those skilled in the art that although the pay-per-view period #1 appears linked to programs #3 and #4 of the TV channel TV1, the pay-per-view period may be defined as a time window of channel TV1 and not as a combination of programs that are broadcast in the time period.

As shown in FIG. 1A, program #2 for TV channel TV2 may be a live event that is scheduled for broadcast between 9:20 am and 12:45 pm. A cancellation of the live event may require an operator to change the programming listed during that time period. In response, an operator needs to be able to place new programming in that slot as well as advise users of the new programming.

Figure 1B:
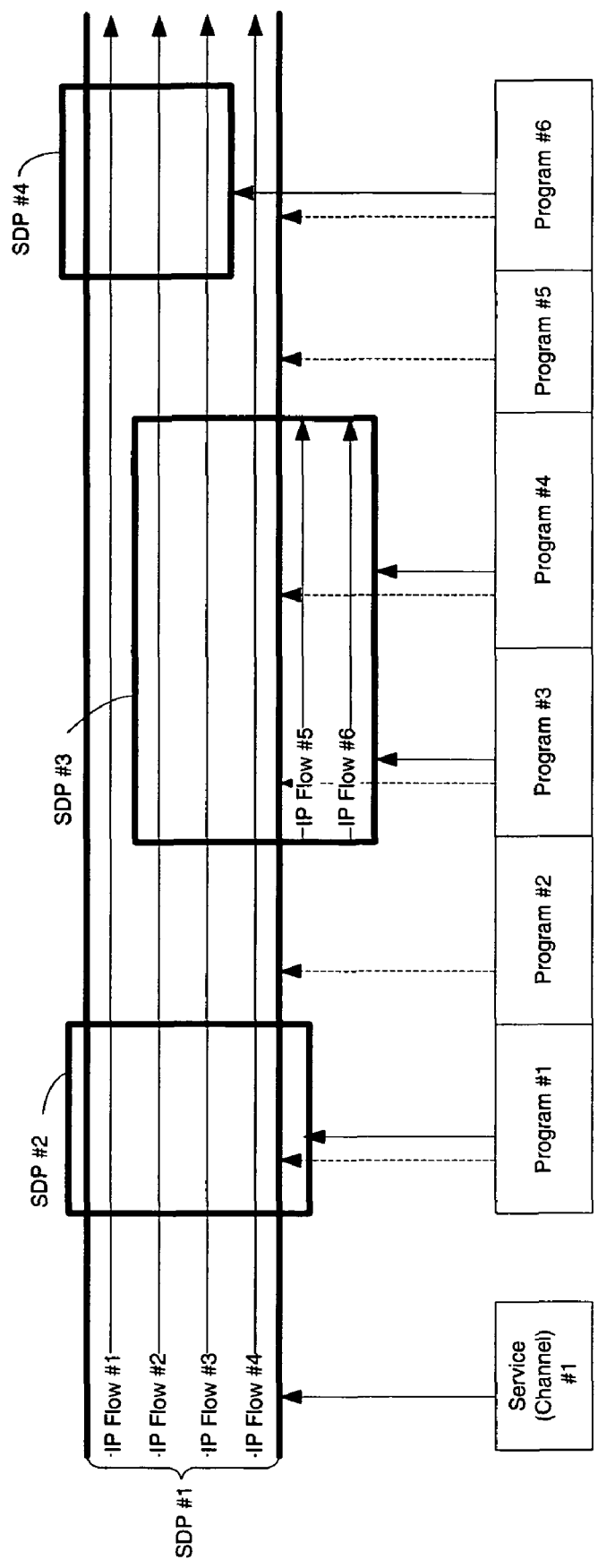
FIG. 1B illustrates a schematic diagram of IP flows and session description protocol files in accordance with at least one aspect of the present invention.

FIG. 1B illustrates a schematic diagram of IP flows and session description protocol files in accordance with at least one aspect of the present invention. FIG. 1B illustrates elements for description of a TV channel. IP Flows #1-#4 are constantly on the air and described by Session Description Protocol (SDP) file #1. An IP flow is a sequence of packets, having the same source and destination addresses, as well as common higher-level protocol, such as User Datagram Protocol (UDP) or Transmission Control Protocol (TCP), type of service, and other characteristics, as indicated by information within the IP packet header. Session Description Protocol (SDP) is a protocol that describes a format for conveying descriptive information about multimedia sessions. This information includes the session name and purpose, the session time, the type of media (voice or audio), the media format, such as MPEG, the transport protocol and port number, the bandwidth requirements, and contact information.

SDP file #2 describes a session with a restricted lifetime for IP Flows #1-#4. The lifetime is restricted to the period of Program #1. SDP file #3 describes a session consisting of IP Flows #2-#4 and IP Flows #5-#6 for a restricted lifetime of Programs #3 and #4. Finally, SDP file #4 describes a session including IP Flows #1-#3 with a restricted lifetime of Program #6. A service that represents a TV channel, such as TV channel #1, is shown with an open-ended SDP file #1 attached. More than one open-ended SDP file may exist. Multiple programs #1-#6 are shown of the service, non-overlapping, covering the entire time axis, each referring to at least one SDP file. Although not shown in FIG. 1B, a gap may exist between programs.

A TV channel under the present invention is flexible as it allows multiple sessions, identified by their SDP file, to share IP Flows. For example, programs #3 and #4 could be a sporting event related transmission, including an additional camera feed and the transmission of synchronized data. The TV channel as shown in FIG. 1B also defines that a service or program can be consumed through multiple sessions. For example, mobile terminals with certain data capabilities may use SDP file #3 while mobile terminals lacking the same data capabilities may use SDP file #1.

Figure 2:
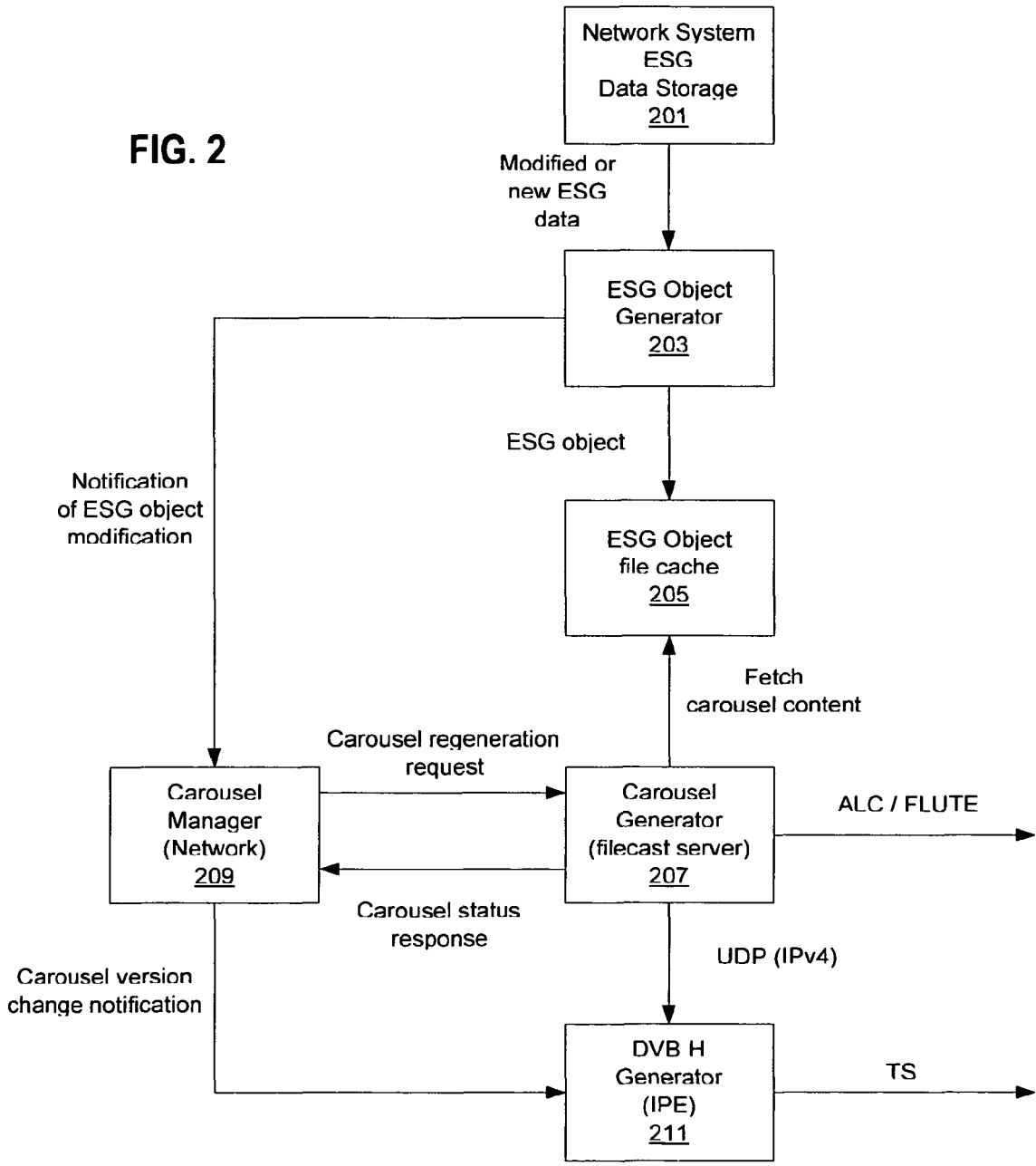
FIG. 2 illustrates a block diagram of a network system for delivering ESG data to a mobile terminal in accordance with at least one aspect of the present invention.

FIG. 2 illustrates a block diagram of a network system for delivering electronic service guide (ESG) data to a mobile terminal in accordance with at least one aspect of the present invention. Network system ESG data storage 201 maintains metadata associated with ESG data. For example, database 201 may include metadata about specific channels, specific programs, and/or specific channel bundles. Other types of metadata that may be stored in database 201 include: channel package data; purchase channel data, such as operator identity data and technical data for performing the transaction, e.g., an address, protocol; price data which may be based upon package/day, channel/minute, program/minute; channel data, such as a textual description for a user, content provider branding information/logo; classification and rating data, such as genre and parental rating; channel SDP data, such as a description of capabilities needed to use the service, e.g., audio and video format and bit rate information, start and end time, addresses, addresses of synchronized auxiliary data feeds, proprietary extensions; and program data, such as a textual description for a user, start and end times, references for interactive services related to the program. This metadata may be loaded by an operator or may be performed automatically.

Modified or new ESG data and associated metadata are encapsulated by the ESG object generator 203 into an ESG object. ESG is a collection of ESG objects. An ESG object is an encapsulated object containing data about the ESG. Encapsulation includes the object type, object version, and object validity information. The version is a sequence number incremented every time the object is modified and the validity information describes the life span of an object thus enabling the cleanup of the metadata storage. ESG objects may not be consistent with each other and/or may refer to another object.

ESG data relates to a network, including one or more cells, and to a geographical area in the network coverage, e.g., cell coverage, as there can be local services available. When a mobile terminal moves from one geographical area to another geographical area, some services may remain available, some may no longer be available, and some may become available. Therefore some of the ESG objects are valid in the new geographical area as in the old geographic area. In one embodiment, a terminal may identify those ESG objects which are valid in the new geographic area and may store/cache objects that are no longer valid. In another embodiment, a terminal may receive and store ESG objects from different frequencies, IP platforms, and network operators and then combine these objects with ESG objects from the current network into a unified ESG.

Returning to FIG. 2, the ESG object is then sent from the ESG object generator 203 to an ESG object file cache 205 where it is stored. In the process, the ESG object replaces the old ESG object stored in the cache 205 with the ESG object associated with the new or modified ESG. The ESG object generator 203 also sends a notification of an ESG object modification to the network carousel manager 209.

The network carousel manager 209 controls operation of the carousel generator 207. Network carousel manager 209 sends a carousel regeneration request to the carousel generator 207 to instruct the carousel generator 207 to fetch the carousel content from the cache 205 that now contains the ESG object associated with the modified or new ESG. In response, carousel generator 207 updates the carousel and notifies the network carousel manager 209 in a carousel status response. The network carousel manager 209 then transmits a carousel version change notification to a DVB-H generator 211. DVB-H generator 211 and carousel generator 207 transmit the ESG object in a carousel and the notification of a change in the carousel version. The DVB-H 211 is shown as transmitting in the transport stream TS and in communication with the carousel generator 207 by means of a user datagram protocol.

Figure 3:
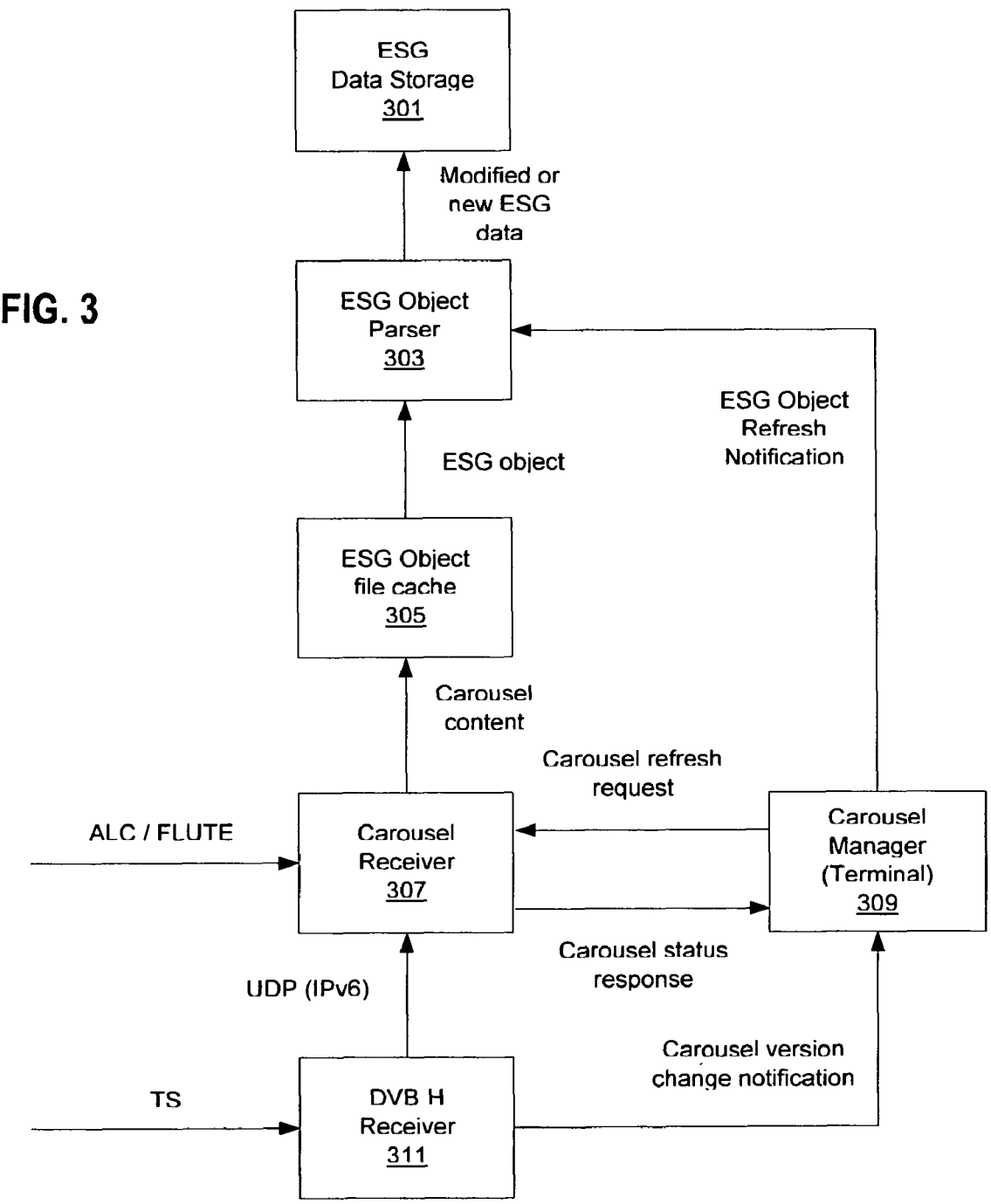
FIG. 3 illustrates a block diagram of a mobile terminal for receiving ESG data from a network in accordance with at least one aspect of the present invention.

The carousel generator 207 transmits the carousel with the ESG object by means of an Asynchronous Layer Coding (ALC)/File Delivery over Unidirectional Transport (FLUTE) protocol. ALC or a protocol based on ALC provides reliable delivery of content and can be used to deliver full or partial ESG data, updates and notification of updates. ALC provides a unidirectional transport service for binary objects, such as files. FLUTE is a protocol for the unidirectional delivery of files over the Internet, which is particularly suited to multicast networks. FLUTE builds on Asynchronous Layered Coding, the base protocol designed for massively scalable multicast distribution. The ALC/FLUTE arrow shown in FIGS. 2 and 3 illustrates that the carousel generator 207 and the carousel receiver 307 can communicate at an application level. The ESG may be transported in one or more object carousels. The object carousels may be expressed as SDP files and/or extensible markup language (XML) files for the sessions. In addition, one or more objects may be transported in delta carousels that contain either whole objects that have been changed or delta objects that contain only those parts of the objects that have been changed. The objects and/or delta objects also may be compressed.

FIG. 3 illustrates a block diagram of a mobile terminal for receiving electronic service guide (ESG) data from a network in accordance with at least one aspect of the present invention. DVB-H receiver 311 receives a notification from the network of a change to the carousel version. This notification is sent via the transport stream. DVB-H receiver 311 sends the notification to a terminal carousel manager 309 for the mobile terminal. In response, terminal carousel manager 309 sends a carousel refresh request to a carousel receiver 307. Terminal carousel manager 309 determines the appropriate time in which to send the request to update the information. For example, an immediate update of the carousel may be ineffective for cost and/or power consumption reasons and the terminal carousel manager 309 may determine to update the carousel at a later time. Terminal carousel manager 309 controls operation of the carousel receiver 307. Carousel receiver 307 receives the transmitted carousel and sends the content to an ESG object file cache 305. Carousel receiver 307 also sends a carousel status response to the terminal carousel manager 309 indicating that the carousel has been received.

Terminal carousel manager 309 then sends a notification that the ESG object has been refreshed to the ESG object parser 303. The ESG object parser 303 obtains the ESG object from the cache 305 and parses the ESG object to remove the encapsulation. The files of the carousel are sent to the cache 305 and the extracted ESG metadata is sent to an ESG data storage 301 for storage. Database 301 maintains the metadata associated with the new or modified ESG data. Under the systems shown in FIGS. 2 and 3, an operator can update a channel program and associated metadata and have that associated metadata be provided to a user of a mobile terminal to update an ESG to show the new channel program.

Figure 4:
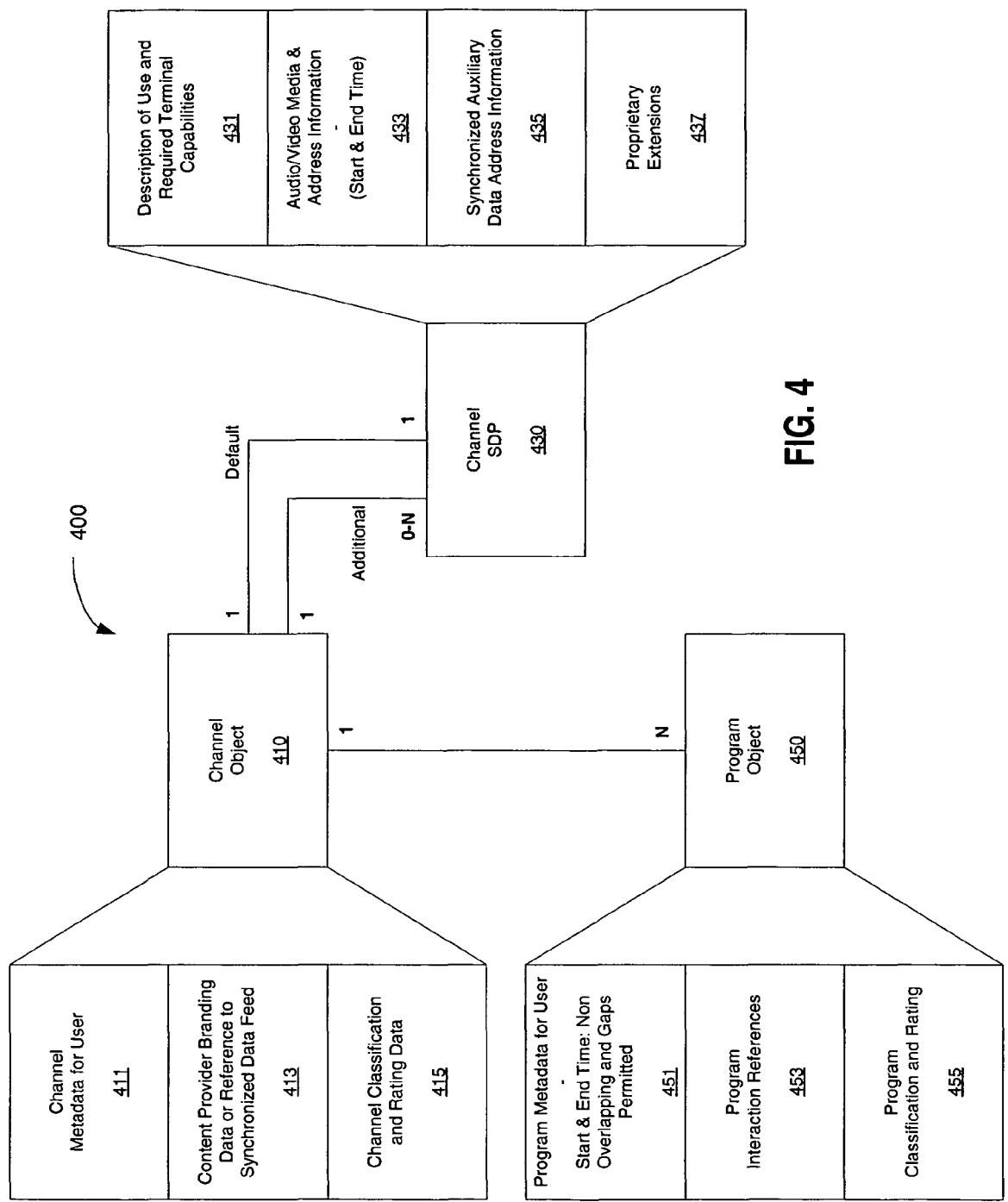
FIG. 4 illustrates a block diagram of information parameters communicated in an ESG object in accordance with at least one aspect of the present invention.

FIG. 4 illustrates a block diagram of information parameters communicated in an ESG object in accordance with at least one aspect of the present invention. As shown, ESG object 400 includes a channel object 410, a channel SDP 430, and a program object 450. Channel object 410 is shown associated with a default channel SDP 430. As described above in FIG. 1B, additional channel SDPs 430 between zero and N may be associated with the channel object 410 as indicated by the O-N. Channel object 410 is also associated with program object 450. As shown, one channel object 410 may be associated with multiple, N, program objects 450.

Channel object 410 includes channel metadata for a user 411, content provider branding data or reference to a synchronized data feed 413, and channel classification and rating data 415. Content provider branding data may be a file or set of files containing information about the content provider, such as a logo, name, and/or contact information. It also may be an HTML page which is then displayed when the content is viewed. Channel SDP 430 includes a description of use and required terminal capabilities 431, audio/video media and address information, including start and end time, 433, synchronized auxiliary data address information 435, and proprietary extensions 437. For example, if there is an advertising space in the terminal screen and the advertisements are synchronized to the TV service, the advertisement carousel address may be included in the audio/video media and address information 433. Other examples are additional audio feeds with different languages, where the addresses of different audio feeds may be included in the audio/video media and address information 433. Subtitles are another example. Finally, program object 450 includes program metadata for a user, including start and end time, non-overlapping with gaps permitted, 451, program interaction references 453, and program classification and rating data 455. An example of program interaction references 453 includes a rating service for the program where a web universal resource locator (URL) is provided in order to launch the terminal browser and allow the user to submit the rating information. An example of classification and rating data 455 includes parental rating or critics review rating.

Figure 5:
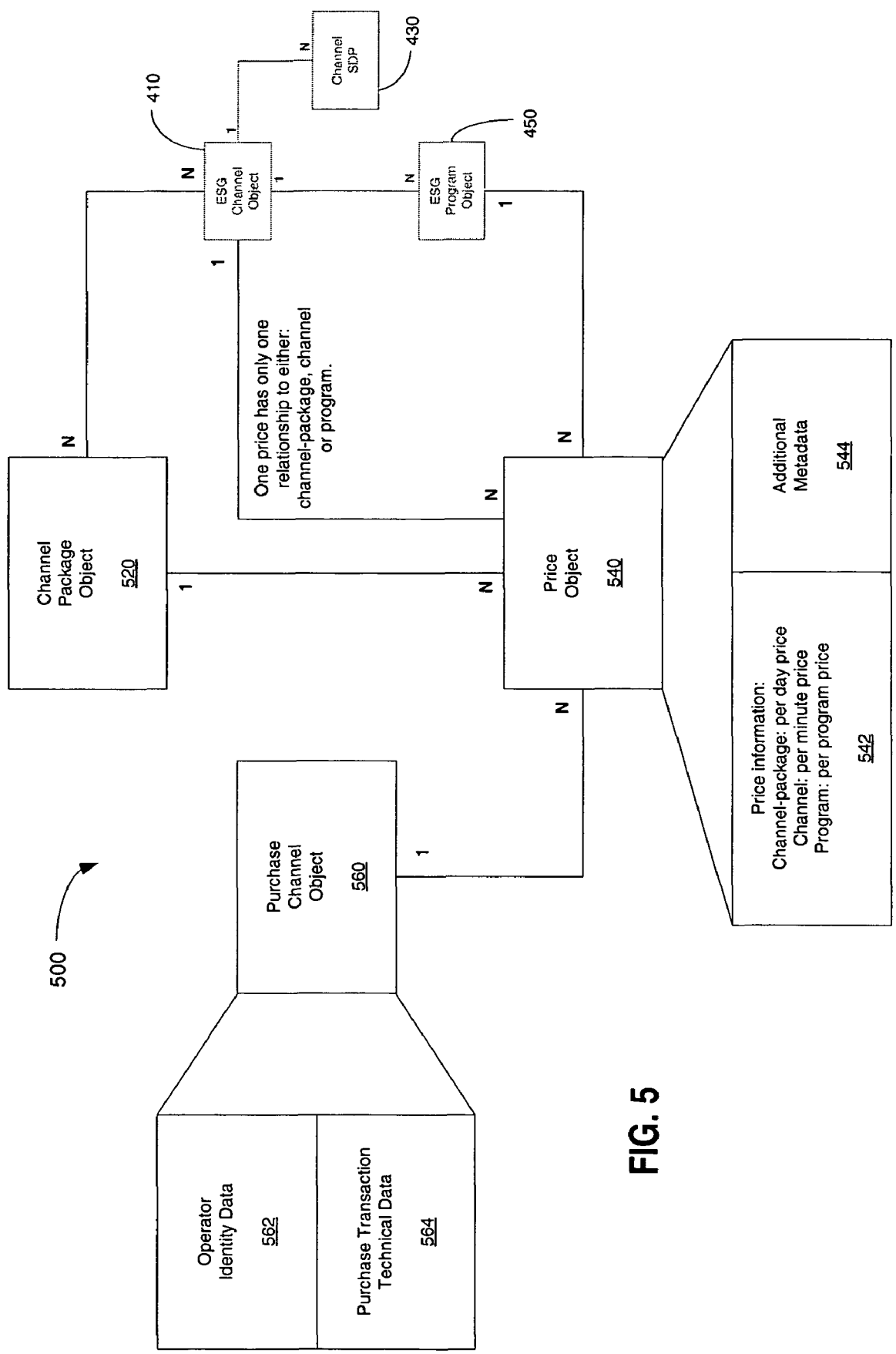
FIG. 5 illustrates a block diagram of information parameters for electronic-commerce communicated in an ESG object in accordance with at least one aspect of the present invention.

FIG. 5 illustrates a block diagram of information parameters for electronic-commerce (e-commerce) communicated in an ESG object in accordance with at least one aspect of the present invention. As shown, ESG object 500 may comprise additional objects within ESG object 400. ESG object 500 may be used for e-commerce transactions, such as pay-per-view and video on demand. As shown, ESG object 500 includes a channel package object 520, a price object 540, and a purchase channel object 560. Any number N channel package objects 520 may be associated with N channel objects 410. In addition, channel package object 520 may be associated with any number N price objects 540. Any number N price objects 450 may be associated with channel object 410 and program object 450. Any number N price objects 540 also are associated with purchase channel object 560.

Price object 540 includes price information data 542 and additional metadata 544. Price information data 542 describes how a channel-package is a per day price, how a channel is a per minute price, and how a program is a per program price. Price information data 542 is one of the three options of channel-package price, channel price, or program price. Purchase channel object 560 includes operator identity data 562 and purchase transaction technical data 564. Operator identity data 562 may be used to select those purchase channels that a current user, e.g., customer to an operator, can use. Purchase transaction technical data 564 may be data that is needed to complete a transaction, such as an address of the e-commerce system and protocol used to communicate with the e-commerce system.

Figure 6:
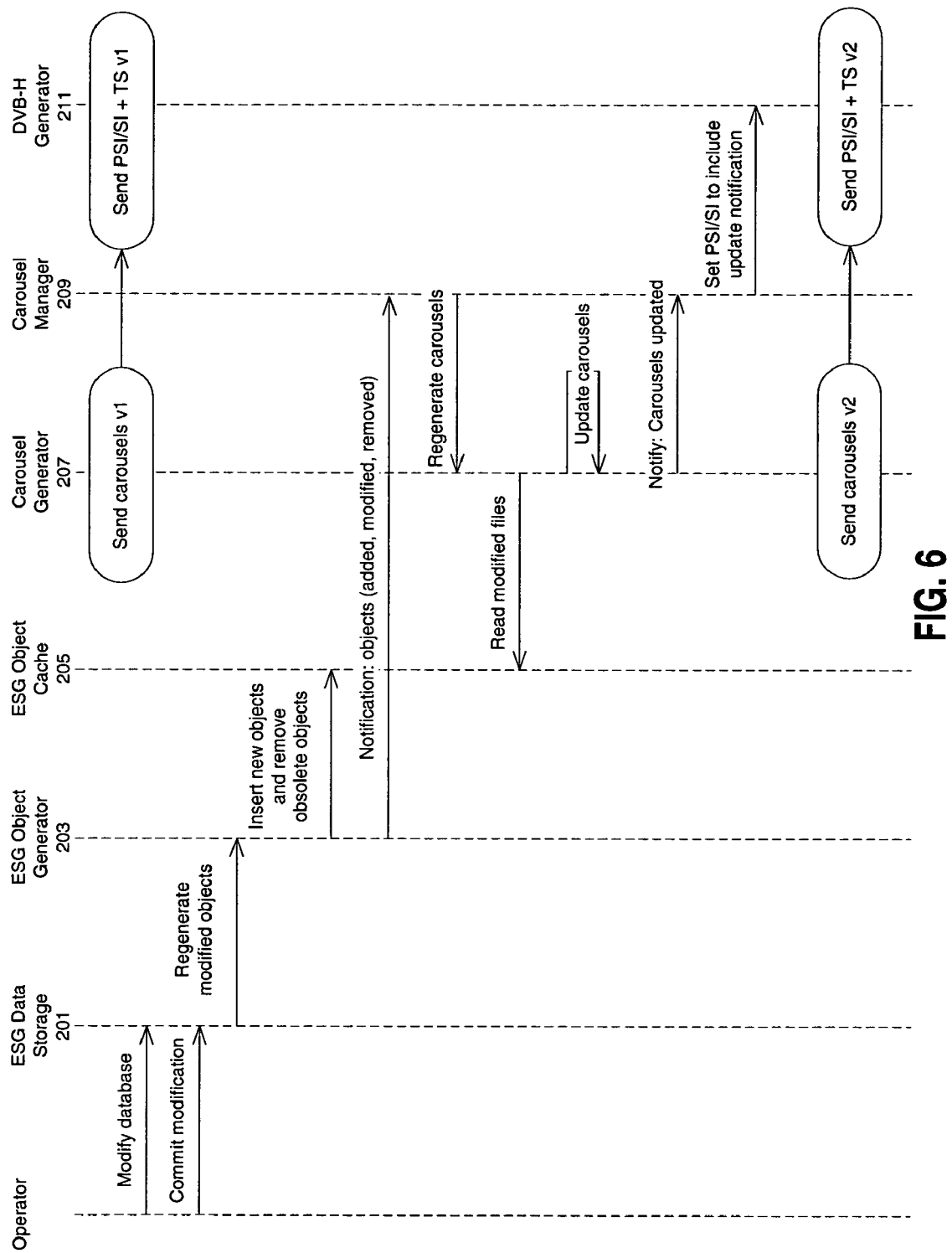
FIG. 6 is a signal processing graph illustrating an example sequence of signal communications between components of a network system configured to deliver ESG to a mobile terminal in accordance with at least one aspect of the present invention.
Figure 7:
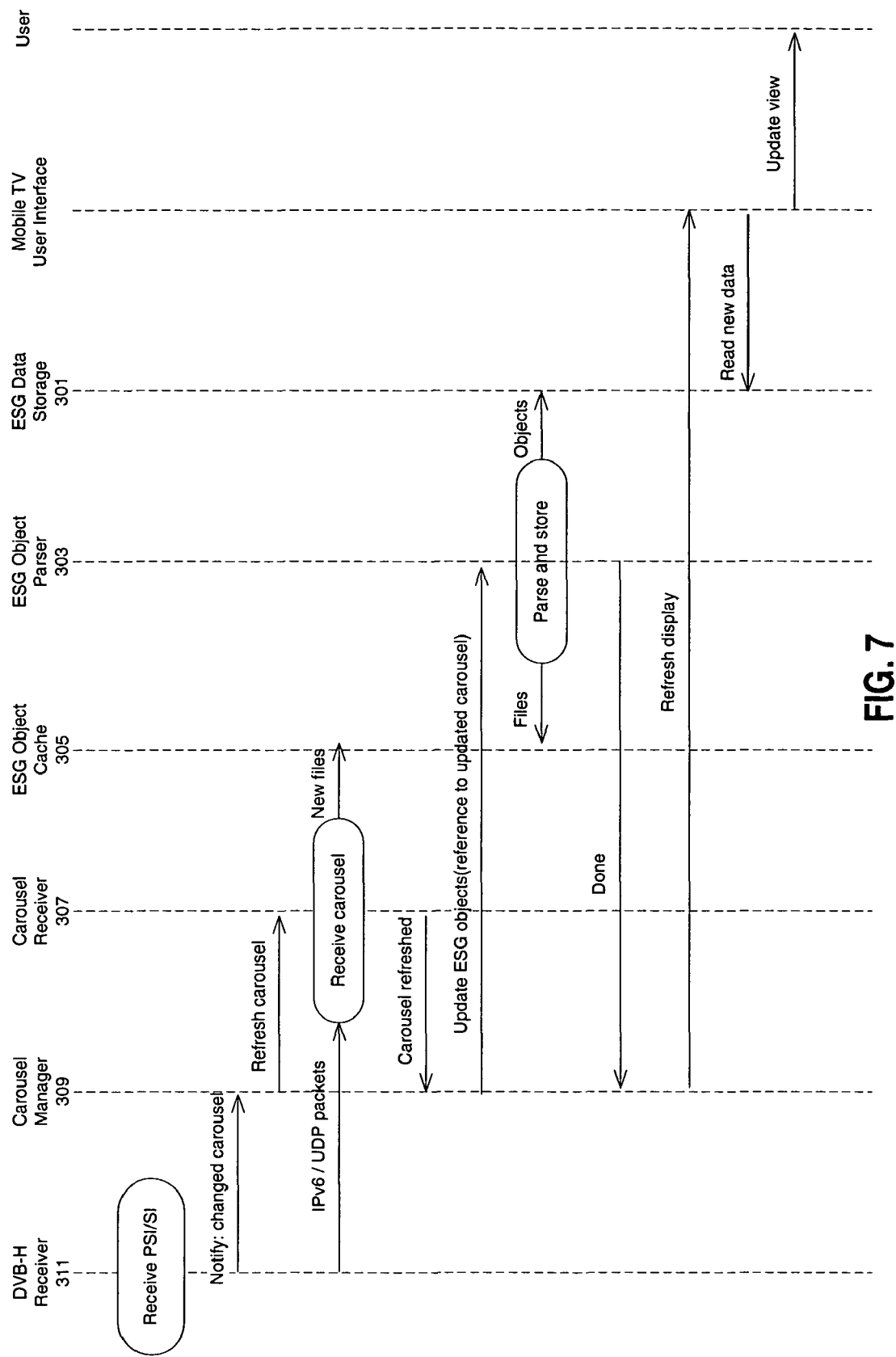
FIG. 7 is a signal processing graph illustrating an example sequence of signal communications between components of a mobile terminal configured to receive ESG from a network system in accordance with at least one aspect of the present invention.

FIG. 6 illustrates a graphical sequence of events for delivery of ESG data from a network. Descriptions of each process are described above with reference to FIG. 2. FIG. 7 illustrates a graphical sequence of events for receipt of ESG data at a mobile terminal. Descriptions of each process are described above with reference to FIG. 3.

Figure 8:
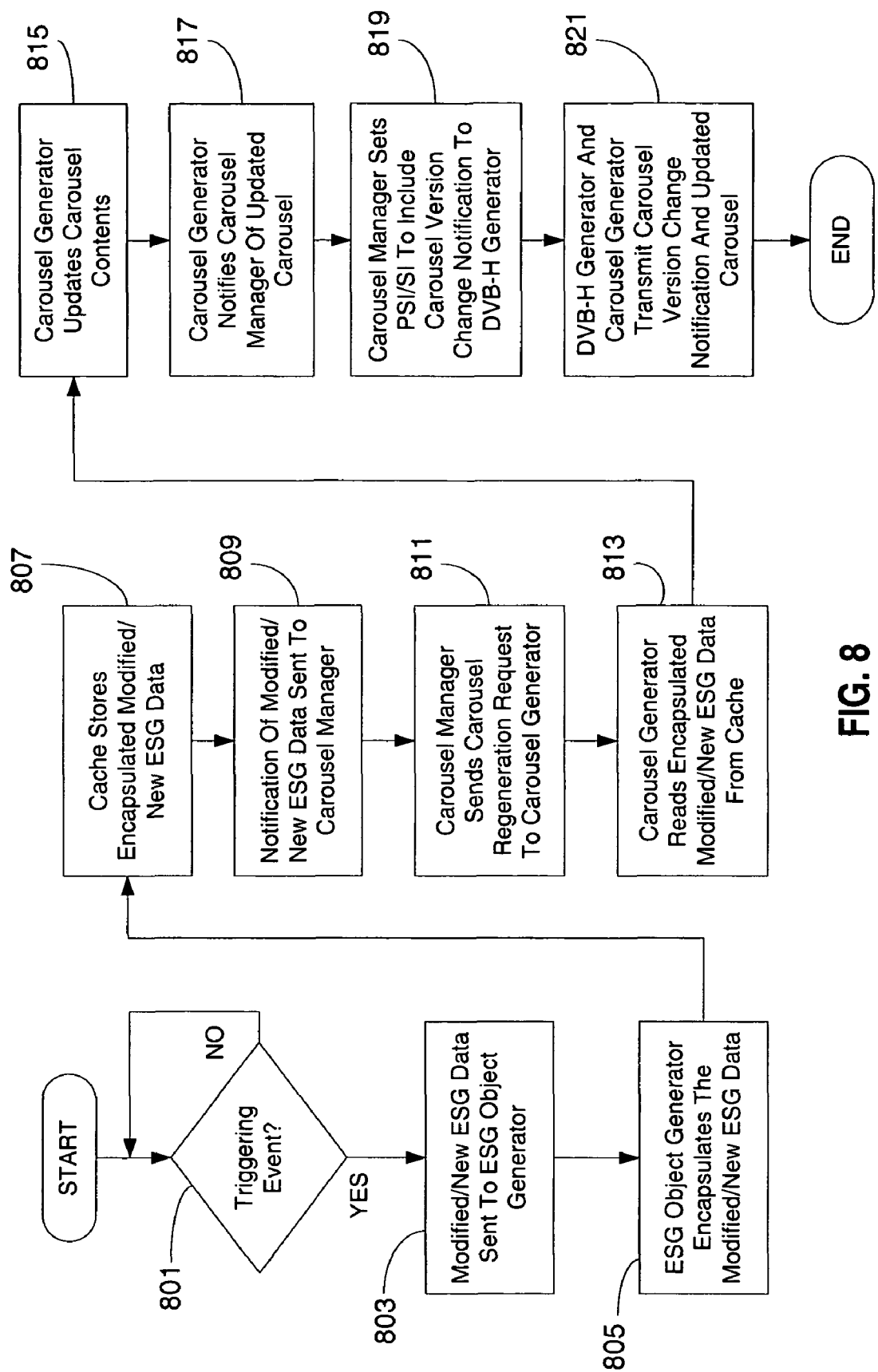
FIG. 8 is a flow chart of an illustrative method for delivering ESG to a mobile terminal in accordance with at least one aspect of the present invention.

FIG. 8 is a flow chart of an illustrative method for delivering ESG to a mobile terminal in accordance with at least one aspect of the present invention. The process starts at step 801 where a determination is made as to whether a triggering event has occurred. As described above, a triggering event may be based upon an override by an operator and/or an automatic change by a network system in response to an event. The event that triggers a response may include the cancellation of an event to be broadcasted, a special news report that interrupts a program, and/or a local sporting event that is blacked out due to a failure to meet necessary tickets sales for broadcasting. If a triggering event has not occurred, the same ESG data is transmitted to mobile terminals. If an event has occurred, the process moves to step 803.

At step 803, modified/new ESG data is sent to an ESG object generator, such as ESG object generator 203. At step 805, the ESG object generator encapsulates the modified/new ESG data, and stores the encapsulated modified/new ESG data in a cache at step 807. This cache may include cache 205 from FIG. 2. At step 809, a notification of the modified/new ESG data is sent to a network carousel manager, such as network carousel manager 209. In response, the network carousel manager sends a carousel regeneration request to the carousel generator, such as carousel generator 207, in step 811. The carousel regeneration request may be an instruction to regenerate the carousel being transmitted to the mobile terminals to include the encapsulated modified/new ESG data. At step 813, the carousel generator reads the encapsulated modified/new ESG data from the cache and updates the carousel contents at step 815.

The process moves to step 817 where the carousel generator notifies the network carousel manager that the carousel has been updated. In response, the network carousel manager sets the Program Specific Information/Service Information (PSI/SI) to include the carousel version change notification and sends to a DVB-H generator at step 819. The DVB-H generator may be DVB-H generator 211 in FIG. 2. At step 821, the DVB-H generator and the carousel generator transmit the carousel version change notification and updated carousel to mobile terminals on the network.

Figure 9:
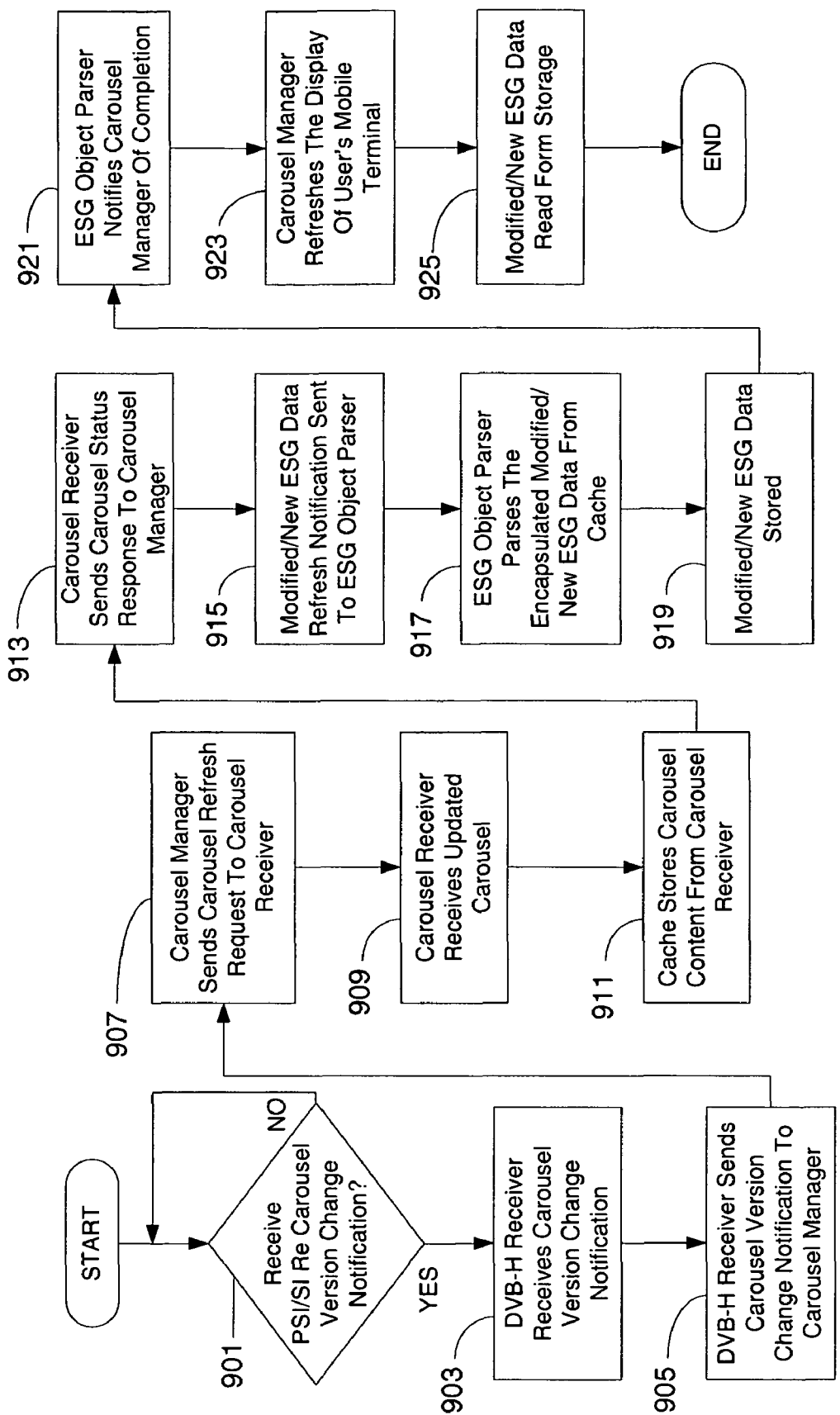
FIG. 9 is a flow chart of an illustrative method for receiving ESG from a network system in accordance with at least one aspect of the present invention.

FIG. 9 is a flow chart of an illustrative method for receiving ESG from a network system in accordance with at least one aspect of the present invention. The process starts at step 901 where a determination is made as to whether a PSI/SI regarding a notification of change to the carousel version has been received. If not, the mobile terminal continues to use the same ESG data. If a notification is received, the process moves to step 903. At step 903, a DVB-H receiver receives the notification of the change of carousel version. The DVB-H receiver may be DVB-H receiver 311. At step 905, the DVB-H receiver sends the notification to a terminal carousel manager for the mobile terminal. The terminal carousel manager may be terminal carousel manager 309 from FIG. 3. In response, the terminal carousel manager sends a refresh request to a carousel receiver at step 907. The carousel receiver may include carousel receiver 307. At step 909, the carousel receiver receives the updated carousel and sends the carousel content to a cache at step 911 where the updated carousel content is stored. The cache may include cache 305 from FIG. 3.

The process moves to step 913 where the carousel receiver sends a carousel status response to the terminal carousel manager indicating that the updated carousel has been received. The terminal carousel manager sends a refresh notification to an ESG object parser at step 915. The ESG object parser may include ESG object parser 303. At step 917, the ESG object parser parses the encapsulated modified/new ESG data from the cache. The modified/new ESG data is then stored in a database at step 919. The database may include database 301. The process continues to step 921 where the ESG object parser notifies the terminal carousel manager that the parsing/extracting process has been completed. At step 923, the terminal carousel manager refreshes the display of the mobile terminal of a user and the modified/new ESG data is read from the cache at step 925 to be viewed by the user.

Figure 10:
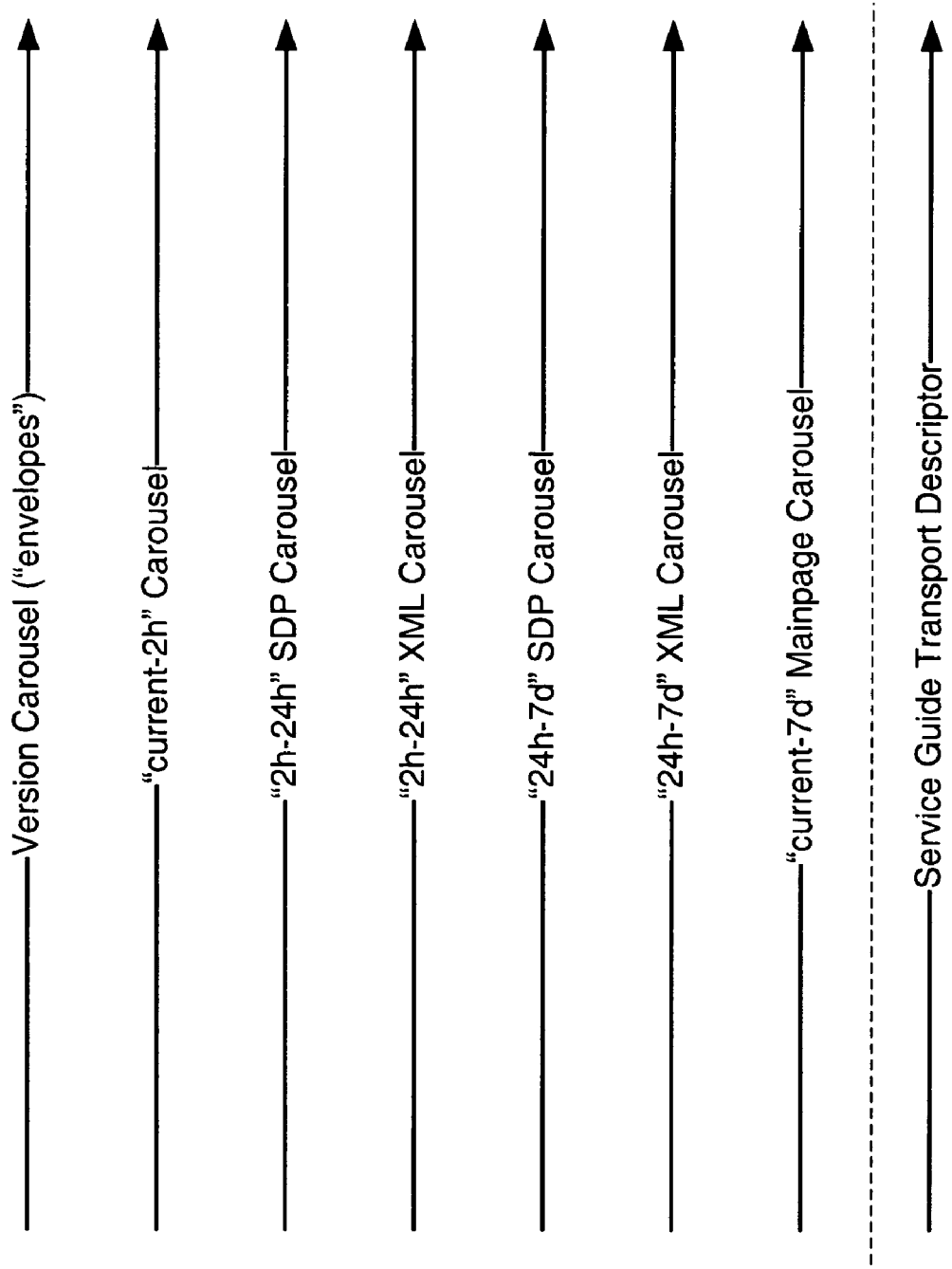
FIG. 10 illustrates different file carousels that include ESG objects in accordance with at least one aspect of the present invention.

FIG. 10 illustrates different file carousels that include ESG objects in accordance with at least one aspect of the present invention. ESG information may be transported in two levels: DVB-H (or some alternative transport layer) and IP (FLUTE carousels). The DVB-H level contains descriptors that may be used to notify the receiving applications when any of the IP level carousels change as a result of an unplanned action. Normal expiration and/or the addition of objects may not prompt a notification even though such circumstances result in a change in the IP level carousels. ESG objects may be transported in file carousels using FLUTE protocol; however, it should be understood by those skilled in the art that the present invention is not limited to FLUTE protocol.

ESG objects are not distributed to the carousels by type. In accordance with aspects of the present invention, the objects are placed on different carousels based on the intended use or lifetime. Objects with a short lifetime, e.g., less than 2 hours, are placed in the current-2 hour carousel. Because the number of objects in the current-2 hour carousel is relatively small, they can all be placed regardless of the type. Objects with a longer lifetime, e.g., today or the next 24 hours, are placed in other carousels. The longer lifetime objects are divided into XML, that is information to the user, and SDP, that is information to the computer, carousels. Such an arrangement allows a mobile terminal application to receive an XML file first thereby presenting the information to the user faster since a computer needs the information only just before the service is being broadcasted/received. All information, which is not related to the broadcasted content but more to promote an identity of a broadcast operator or content provider, may be placed to the current-7 days mainpage carousel. The objects in this carousel may be of various types, such as HTML pages, image files, and/or sound files.

A version carousel ("envelopes") is a collection of the envelopes in the carousels. The envelope is a XML structure of which an example is presented below:

```
<?xml version="1.0" encoding="UTF-8"?>
<xs:schema xmlns:xs="http://www.w3.org/2001/XMLSchema"
    element FormDefault="qualified"
    attributeFormDefault="unqualified">
    <xs:element name="metadataEnvelope">
        <xs:complexType>
            <xs:sequence>
                <xs:any minOccurs="0" maxOccurs="unbounded"/>
            </xs:sequence>
            <xs:attribute          name="metadataURI"
                                   type="xs:anyURI"
                                   use="required"/>
            <xs:attribute          name="version"
                                   type="xs:positive Integer"
                                   use="required"/>
            <xs:attribute          name="validFrom"
                                   type="xs:dateTime"
                                   use="optional"/>
            <xs:attribute          name="validUntil"
                                   type="xs:dateTime"
                                   use="optional"/>
            <xs:choice minOccurs="0" maxOccurs="1">
                <xs:element name="asciiPayload">
                    <xs:complexType>
                        <xs:attribute      name="type"
                                           type="xs:string"
                                           use="required"/>
                    </xs:complexType>
                </xs:element>
                <xs:element name="xmlPayload">
                    <xs:complexType>
                        <xs:sequence>
                            <xs:any maxOccurs="unbounded"
                                    processContents="skip"/>
                        </xs:sequence>
                    </xs:complexType>
                </xs:element>
            </xs:choice>
            <xs:anyAttribute processContents="skip"/>
        </xs:complexType>
    </xs:element>
</xs:schema>
```

Figure 11:
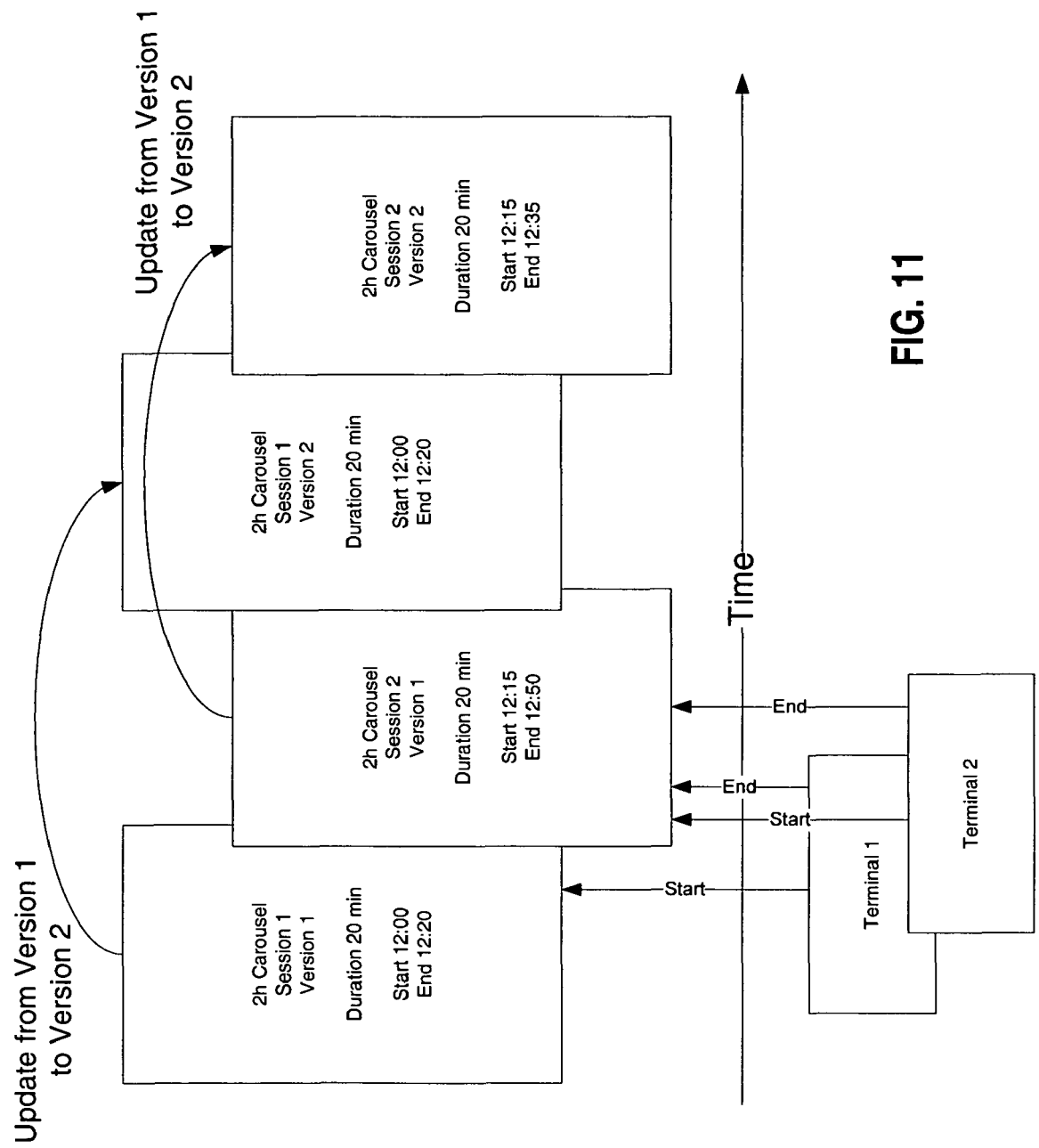
FIG. 11 illustrates a block diagram of a modification of a carousel in accordance with at least one aspect of the present invention.

FIG. 11 illustrates an example of carousel modification for a 2 h carousel. The carousel is implemented using two file cast sessions. At least one is always active and the two may overlap. The length of overlap is the time that it takes for receiving the full content of the carousel in case there are errors in reception. Terminals that start the reception process when two carousels are running may use the carousel identified by a larger session number, a certain timestamp and/or other information. Using two sessions as illustrated in FIG. 11 allows easier detection of reception completeness. Even if the session is constantly altered, the receiving terminal would merely be required to receive the content on a constant basis.

One or more aspects of the invention may be embodied in computer-executable instructions, such as in one or more program modules, executed by one or more computers, set top boxes, mobile terminals, or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

We claim:

1. A method comprising:
    causing, at least in part, reception of at least one modified or new electronic service guide data at a server;
    encapsulating, at the server, the at least one modified or new electronic service guide data and metadata associated with the modified or new electronic service guide data to generate a new electronic service guide object;
    replacing, at a cache of the server, a current electronic service guide object with the new electronic service guide object;
    generating a new carousel and a notification of carousel version change at the server, said new carousel including the new electronic service guide object and excluding the current electronic service guide object;
    causing, at least in part, transmission of the new carousel from the server to a mobile terminal without simultaneously transmitting a carousel consisting of one or more updated sessions; and
    causing, at least in part, transmission of the notification of carousel version change from the server to the mobile terminal,
    wherein the new electronic service guide object excludes pre-modified electronic service guide data that is modified into the modified electronic service guide data.

2. The method of claim 1, further comprising detecting an occurrence of a triggering event.

3. The method of clam 2, wherein the electronic service guide data is received responsive to detecting the occurrence of the triggering event.

4. The method of claim 1, wherein the electronic service guide data is created in response to an operator input.

5. The method of claim 1, wherein the electronic service guide objects placed on different carousels based on cache lifetime.

6. The method of claim 1, wherein the new electronic service guide object includes a channel object component and at least one channel session description protocol (SDP) component.

7. The method of claim 6, wherein the channel object component includes channel metadata and channel classification and rating data.

8. The method of claim 6, wherein the at least one channel SDP component includes a description of use and mobile terminal capabilities, audio/video media and address information and synchronized auxiliary data address information.

9. The method of claim 6, wherein the new electronic service guide object further includes a channel package object component, at least one price object component, and at least one purchase channel object component.

10. The method of claim 9, wherein the at least one price object component includes price information data and additional metadata.

11. The method of claim 9, wherein the at least one purchase channel object includes operator identity data and purchase transaction technical data.

12. The method of claim 1, wherein the at least one program object component includes program metadata and program classification and rating data.

13. The method of claim 1, further comprising transmitting one or more electronic service guide objects in delta carousels that contain either whole electronic service guide objects that have been changed or delta electronic service guide objects that contain only parts of the whole electronic service guide objects that have been changed.

14. The method of claim 1, further comprising transmitting in a digital video broadcasting-handheld level the new electronic service guide object with a descriptor that indicates a change in an internet protocol level carousel caused by an unplanned action.

15. The method of claim 1, wherein the current carousel and the new carousel is transmitted via two file cast sessions in an overlapping manner, wherein a length of overlap is a time period required for the mobile terminal to receive full content of a carousel in case of errors in reception.

16. The method of claim 1, wherein the new carousel corresponds to a plurality of session description protocol files and the files share a plurality of carousels including the new carousel.

17. The method of claim 16, wherein the new carousel corresponds to one or more programs, one or more services, or a combination thereof.

18. The method of claim 16, wherein the new electronic service guide object is a session description protocol file corresponding to the new carousel, or the new electronic service guide object is within a session description protocol file corresponding to the new carousel.

19. The method of claim 16, further comprising: including information of update required terminal capabilities in a session description protocol file corresponding to the new carousel.

20. The method of claim 16, further comprising: including in a session description protocol file corresponding to the new carousel a rating service for a program, wherein a web universal resource locator is provided to launch a terminal browser and to allow a user to submit a rating of the program.

21. The method of claim 16, wherein at least a service, program or combination thereof is described in each of the plurality of session description protocol files corresponding to the new carousel.

22. A method comprising:
    determining whether a notification of carousel version change is received at a mobile terminal;
    when a notification of carousel version change is received at the mobile terminal, causing, at least in part, reception of a carousel without simultaneously receiving another carousel consisting of one or more updated sessions;
    treating the carousel as a new carousel including at least one modified or new electronic service guide object;
    replacing, at a cache of the mobile terminal, a current electronic service guide object with the new electronic service guide object;

extracting the at least one modified or new electronic service guide data and metadata associated with the at least one modified or new electronic service guide data from the new electronic service guide object; and causing, at least in part, storage of the at least one modified or new electronic service guide data and the metadata at the mobile terminal, wherein the new electronic service guide object excludes pre-modified electronic service guide data that is modified into the modified electronic service guide data.

23. The method of claim 22, further comprising determining when to update the electronic service guide data at the mobile terminal.

24. The method of claim 23, wherein the determining is based on power consumption.

25. The method of claim 22, further comprising refreshing a display on the mobile terminal with the at least one modified or new electronic service guide data.

26. The method of claim 22, wherein the new electronic service guide object includes a channel object component and at least one channel session description protocol (SDP) component.

27. The method of claim 26, wherein the channel object component includes channel metadata and channel classification and rating data.

28. The method of claim 26, wherein the at least one channel SDP component includes a description of use and mobile terminal capabilities, audio/video media and address information, synchronized auxiliary data address information, and proprietary extensions.

29. The method of claim 26, wherein the new electronic service guide object further includes a channel package object component, at least one price object component, and at least one purchase channel object component.

30. The method of claim 29, wherein the at least one price object component includes price information data and additional metadata.

31. The method of claim 29, wherein the at least one purchase channel object includes operator identity data and purchase transaction technical data.

32. The method of claim 22, wherein the at least one program object component includes program metadata and program classification and rating data.

33. The method of claim 22, further comprising:
forming a unified electronic service guide object by combining the current electronic service guide object with the new electronic service guide object.

34. The method of claim 33, further comprising:
determining that the mobile terminal has moved to a new geographic area, wherein the current electronic service guide object is no longer available, and wherein the forming of the unified electronic service guide object is responsive to the determination.

35. An apparatus comprising:
at least one processor; and
at least one memory including computer program code,
the at least one memory and the computer program code configured to, with the at least one processor, cause the apparatus to perform at least the following,
receive at least one modified or new electronic service guide data;
encapsulate the at least one modified or new electronic service guide data and metadata associated with the modified or new electronic service guide data to generate a new electronic service guide object;
replace, at a cache of the apparatus, a current electronic service guide object with the new electronic service guide object;
generate a new carousel and a notification of carousel version change, said new carousel including the new electronic service guide object and excluding the current electronic service guide object;
transmit the new carousel to a mobile terminal without simultaneously transmitting a carousel consisting of one or more updated sessions; and
transmit the notification of carousel version change to the mobile terminal,
wherein the new electronic service guide object excludes pre-modified electronic service guide data that is modified into the modified electronic service guide data.

36. The apparatus of claim 35, wherein the electronic service guide objects placed on different carousels based on lifetime and not by type.

37. The apparatus of claim 35, wherein the new electronic service guide object includes a channel object component and at least one channel session description protocol (SDP) component.

38. The apparatus of claim 37, wherein the new electronic service guide object further includes a channel package object component, at least one price object component, and at least one purchase channel object component.

39. The apparatus of claim 28, wherein the digital broadcast generator is a digital video broadcasting-handheld generator.

40. An apparatus comprising:
at least one processor; and
at least one memory including computer program code,
the at least one memory and the computer program code configured to, with the at least one processor, cause the apparatus to perform at least the following,
determine whether a notification of carousel version change is received at the apparatus;
when a notification of carousel version change is received, receive a carousel without simultaneously receiving another carousel consisting of one or more updated sessions;
treat the carousel as a new carousel including at least one modified or new electronic service guide object;
replace, at a cache of the apparatus, a current electronic service guide object with the new electronic service guide object;
extract the at least one modified or new electronic service guide data and metadata associated with the at least one modified or new electronic service guide data from the new electronic service guide object; and
store the at least one modified or new electronic service guide data and the metadata at the apparatus,
wherein the new electronic service guide object excludes pre-modified electronic service guide data that is modified into the modified electronic service guide data.

41. The apparatus of claim 40, wherein the apparatus is further caused to refresh a display on the mobile terminal with the at least one modified or new electronic service guide data.

42. The apparatus of claim 40, wherein the new electronic service guide object includes a channel object component and at least one channel session description protocol (SDP) component.

43. The apparatus of claim 42, wherein the new electronic service guide object further includes a channel package object component, at least one price object component, and at least one purchase channel object component.

44. The apparatus of claim 40, wherein the digital broadcast receiver is a digital video broadcasting-handheld receiver.

45. A computer-readable storage medium carrying one or more sequences of one or more instructions which, when executed by one or more processors, cause an apparatus to at least perform the following steps:
receiving at least one modified or new electronic service guide data;
encapsulating the at least one modified or new electronic service guide data and metadata associated with the modified or new electronic service guide data to generate a new electronic service guide object;
replacing, at a cache of the apparatus, a current electronic service guide object with the new electronic service guide object;
generating a new carousel and a notification of carousel version change, said new carousel including the new electronic service guide object and excluding the current electronic service guide object;
transmitting the new carousel to a mobile terminal without simultaneously transmitting a carousel consisting of one or more updated sessions; and
transmitting the notification of carousel version change to the mobile terminal,
wherein the new electronic service guide object excludes pre-modified electronic service guide data that is modified into the modified electronic service guide data.

46. The computer-readable storage medium of claim 45, wherein the apparatus is caused to further perform:
detecting an occurrence of a triggering event.

47. The computer-readable storage medium of claim 46, wherein the instructions that, when executed, cause the computer to receive electronic service guide data are configured to receive the electronic service guide data responsive to detecting the occurrence of the triggering event.

48. The computer-readable storage medium of claim 45, wherein the electronic service guide objects placed on different carousels based on lifetime and not by type.

49. The computer-readable storage medium of claim 45, wherein the electronic service guide data is one of: a new electronic service guide data and a modified electronic service guide data.

50. The computer-readable storage medium of claim 45, wherein the new electronic service guide object includes a channel object component and at least one channel session description protocol (SDP) component.

51. A computer-readable storage medium carrying one or more sequences of one or more instructions which, when executed by one or more processors, cause an apparatus to at least perform the following steps:
determining whether a notification of carousel version change is received at the apparatus;
when a notification of carousel version change is received, receiving a carousel without simultaneously receiving another carousel consisting of one or more updated sessions;
treating the carousel as a new carousel including at least one modified or new electronic service guide object;
replacing, at a cache of the apparatus, a current electronic service guide object with the new electronic service guide object;
extracting the at least one modified or new electronic service guide data and metadata associated with the at least one modified or new electronic service guide data from the new electronic service guide object; and
storing the at least one modified or new electronic service guide data and the metadata at the apparatus,
wherein the new electronic service guide object excludes pre-modified electronic service guide data that is modified into the modified electronic service guide data.

* * * * *